(12) United States Patent
Park et al.

(10) Patent No.: US 12,500,229 B2
(45) Date of Patent: Dec. 16, 2025

(54) ANODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Yang Kyu Park, Daejeon (KR); Seon Ah Kim, Daejeon (KR); Jong Hyuk Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/415,666

(22) Filed: Jan. 18, 2024

(65) Prior Publication Data

US 2024/0266505 A1 Aug. 8, 2024

(30) Foreign Application Priority Data

Jan. 31, 2023 (KR) .................. 10-2023-0013154

(51) Int. Cl.
*H01M 4/36* (2006.01)
*C01B 33/113* (2006.01)
(Continued)

(52) U.S. Cl.
CPC ........... *H01M 4/366* (2013.01); *C01B 33/113* (2013.01); *H01M 4/133* (2013.01); *H01M 4/48* (2013.01);
(Continued)

(58) Field of Classification Search
CPC ........ H01M 4/366; H01M 4/133; H01M 4/48; H01M 4/587; H01M 10/052; H01M 2004/021; H01M 2004/027; C01B 33/113; C01P 2002/60; C01P 2002/74; C01P 2006/12
See application file for complete search history.

(56) References Cited

U.S. PATENT DOCUMENTS

| | | | | |
|---|---|---|---|---|
| 2005/0074672 A1* | 4/2005 | Matsubara | ............ | H01M 4/587 429/231.95 |
| 2013/0045418 A1* | 2/2013 | Oguni | ................... | H01M 4/139 977/734 |

(Continued)

FOREIGN PATENT DOCUMENTS

| | | | |
|---|---|---|---|
| EP | | 3748741 A1 | 12/2020 |
| KR | 10-2017-0057309 A | | 5/2017 |

(Continued)

OTHER PUBLICATIONS

ThermoFisher, Characterization of Amorphous and Microcrystalline Silicon using Raman Spectroscopy, ThermoScientific, 2009 (Year: 2009).*

(Continued)

*Primary Examiner* — Ula C Ruddock
*Assistant Examiner* — Olivia Mason Ruggiero
(74) *Attorney, Agent, or Firm* — IP & T GROUP LLP

(57) ABSTRACT

An anode active material for a lithium secondary battery includes a silicon-based active material that includes a core particle and a carbon coating formed over or on the core particle. The anode active material satisfies specific relation within a specific range. A lithium secondary battery includes an anode including the anode active material, and a cathode facing the anode.

12 Claims, 2 Drawing Sheets

(51) Int. Cl.

| | | |
|---|---|---|
| *H01M 4/02* | (2006.01) | |
| *H01M 4/133* | (2010.01) | |
| *H01M 4/48* | (2010.01) | |
| *H01M 4/587* | (2010.01) | |
| *H01M 10/052* | (2010.01) | |

(52) U.S. Cl.
CPC ......... *H01M 4/587* (2013.01); *H01M 10/052* (2013.01); *C01P 2002/60* (2013.01); *C01P 2002/74* (2013.01); *C01P 2006/12* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 2016/0118655 | A1* | 4/2016 | Yoshikawa | C01B 33/113 252/182.1 |
| 2017/0012282 | A1* | 1/2017 | Kondo | H01M 4/134 |
| 2017/0033355 | A1* | 2/2017 | Kondo | H01G 11/24 |
| 2018/0151873 | A1* | 5/2018 | Matsuno | H01M 4/483 |
| 2019/0027781 | A1* | 1/2019 | Lee | H01M 4/366 |
| 2020/0373564 | A1* | 11/2020 | Yasuda | H01M 4/625 |
| 2021/0135209 | A1* | 5/2021 | Hayner | H01M 10/0525 |
| 2022/0052324 | A1* | 2/2022 | Yi | H01M 4/661 |
| 2024/0038963 | A1* | 2/2024 | Oh | H01M 4/131 |

FOREIGN PATENT DOCUMENTS

| | | | |
|---|---|---|---|
| KR | 10-2017-0099748 A | 9/2017 | |
| KR | 10-2021-0094685 A | 7/2021 | |
| KR | 10-2021-0101540 A | 8/2021 | |
| KR | 10-2325754 B1 | 11/2021 | |
| WO | WO-2022002404 A1 * | 1/2022 | ............ C01B 33/02 |
| WO | WO-2022239676 A1 * | 11/2022 | ............ C01B 33/32 |

OTHER PUBLICATIONS

"Unraveling the Correlation between Ramana and Photoluminescence in Monolayer MoS2 through Machine-Learning Models", Adv. Mater. 2022, 34, 2202911 (Year: 2022).*

Samuel Tardif et al., "Operando Raman Spectroscopy and Synchroton X-ray Diffraction of Lithiation/Delithiation in Silicon Nanoparticle Anodes", ACS Nano, Nov. 7, 2017, pp. 11306-11316, vol. 11, No. 11, ACS Publications.

Mingcai Zhao et al., "The preparation of mass producible, highly-cycling stable Si/C anode materials with nano-sized silicon crystals embedded in highly amorphous silicon matrix", Nanotechnology, Sep. 7, 2021, p. 1-14, vol. 32, No. 48, IOP Publishing.

The Extended European Search Report for European Patent Application No. 24153902.2 issued by the European Patent Office on Jun. 21, 2024.

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2023-0013154 filed on Jan. 31, 2023, the entire disclosure of which is incorporated by reference herein.

BACKGROUND

1. Field

Embodiments of the present disclosure relate to an anode active material for a lithium secondary battery and a lithium secondary battery including the same.

2. Description of the Related Art

Secondary batteries can be charged and discharged repeatedly and are widely employed as power source of mobile electronic devices such as camcorders, mobile phones, laptop computers, and the like. Some examples of secondary batteries include lithium secondary batteries, nickel-cadmium batteries, and nickel-hydrogen batteries. The lithium secondary batteries are more widely developed and applied than the other secondary batteries mainly because of their higher operational voltage, energy density per unit weight, charging rate, and their very compact dimensions.

For example, the lithium secondary battery may include an electrode assembly including a cathode, an anode and a separation layer (separator), and an electrolyte immersing the electrode assembly. The lithium secondary battery may further include an outer case, for example a pouch type enclosing the electrode assembly and the electrolyte.

The anode may contain a material such as a carbon-based (e.g., graphite), or a silicon-based material that can intercalate or store lithium ions during the battery operation as an anode active material. Repeat charging and discharging of the lithium secondary battery may cause mechanical and chemical damage or deterioration such as cracks of the active material particles due to expansion and contraction, degraded or less contact between the anode active material particles, and short-circuits.

Efforts to improve the stability of the anode active material are complex because changing the structure, or shape, of the particles may also change their conductivity and the power of the secondary battery. Hence, novel solutions are needed that improve the stability of the anode active material particle, prevent a decrease in the conductivity and power/capacity properties of the secondary battery.

SUMMARY

The present invention solves the aforementioned problems of the prior art. According to an embodiment of the present disclosure, there is provided an anode active material for a lithium secondary battery having improved, stability, electrical property and activity. The term activity as used here refers to the ability of the battery to perform its intended functions effectively, and encompasses various aspects of the battery performance, such as capacity, charging and discharging rates, cycle life, and overall efficiency.

According to another embodiment of the present disclosure, there is provided a lithium secondary battery employing the inventive anode active material and having significantly improved electrical properties and activity.

An anode active material includes a silicon-based active material including a core particle and a carbon coating formed over or on the core particle. The silicon active material has an $S_A$ defined by Equation 1 in a range from 1.0 to 1.5.

$$S_A = Cs \times (I_C/I_A) \qquad \text{[Equation 1]}$$

In Equation 1, Cs is a numerical value of a silicon crystallite size expressed in a unit of nm of the silicon-based active material obtained by an X-ray diffraction analysis, $I_C$ is a peak intensity corresponding to a crystalline region of the silicon-based active material obtained by a Raman spectroscopy, and $I_A$ is a peak intensity corresponding to an amorphous region of the silicon-based active material obtained by the Raman spectroscopy.

In some embodiments, in Equation 1, $I_C$ is a maximum value of peak intensities measured at a Raman shift of 500 $cm^{-1}$ to 530 $cm^{-1}$, and $I_A$ is a maximum value of peak intensities measured at a Raman shift of 450 $cm^{-1}$ to 490 $cm^{-1}$.

In some embodiments, the core particle may include $SiO_x$ (0<x<2).

In some embodiments, the carbon coating may include a crystalline carbon, an amorphous carbon, or a combination thereof.

In some embodiments, a content of the carbon coating may be in a range from 1 wt % to 10 wt % based on a total weight of the silicon-based active material.

In some embodiments, the carbon coating may cover 50% or more of an outer surface of the core particle.

In some embodiments, the silicon crystallite size of the silicon-based active material may be in a range from 3.0 nm to 7.0 nm In some embodiments, $I_C/I_A$ in Equation 1 may be greater than 0, and less than or equal to 0.4.

In some embodiments, a specific surface area of the silicon-based active material may be in a range from 7 $m^2/g$ to 9 $m^2/g$.

In some embodiments, $S_B$ defined by Equation 2 may be in a range from 0.1 to 0.3.

$$S_B = SPAN^2/SSA \qquad \text{[Equation 2]}$$

In Equation 2, SPAN represents $(D_{90}-D_{10})/D_{50}$, $D_{10}$, $D_{50}$ and $D_{90}$ are particle diameters at volume fractions of 10%, 50% and 90%, respectively, in a volume-weighted particle size distribution of the silicon-based active material, and SSA is a specific surface area in a unit of $m^2/g$ of the silicon-based active material.

In some embodiments, SPAN in Equation 2 may be in a range from 0.1 to 3.0.

In some embodiments, $S_C$ defined by Equation 3 may be in a range from 5.5 to 6.5.

$$S_C = (I_D/I_G)/FWHM \qquad \text{[Equation 3]}$$

In Equation 3, $I_D$ is a peak intensity of a D band of the silicon-based active material obtained by a Raman spectroscopy, $I_G$ is a peak intensity of a G band of the silicon-based active material obtained by the Raman spectroscopy, and FWHM is a numerical value of a full width at half maximum of a peak at 520 $cm^{-1}$ in a Raman spectrum obtained by the Raman spectroscopy for the silicon-based active material.

In some embodiments, the anode active material may further include a carbon-based active material.

In some embodiments, a content of the silicon-based active material may be greater than 0 wt %, and less than or equal to 10 wt % based on a total weight of the anode active material for a lithium secondary battery.

A lithium secondary battery includes an anode including the anode active material for a lithium secondary battery according to the above-described embodiments, and a cathode facing the anode.

A lithium secondary battery comprises an anode comprising an anode active material, a cathode facing the anode, a separator disposed between the anode and the cathode, and an electrolyte disposed between the anode and the cathode.

The anode active material comprises a silicon-based core particle and a carbon coating formed on the silicon-based core particle, and the anode active material is further characterized by an $S_A$ value ranging from 1.0 to 1.5, wherein the $S_A$ is defined by Equation 1.

The anode active material according to embodiments of the present disclosure may include a silicon-based active material including a core particle and a carbon coating formed over or on the core particle. An energy density and charge/discharge capacity of the anode active material may be enhanced by the silicon-based active material. The carbon coating may prevent a contact between the core particle and an electrolyte solution, and may improve the structural stability of the anode active material. Additionally, power properties may be improved by the carbon coating, and a high anode activity may be maintained for a long period.

A crystallinity and a particle size distribution of the silicon-based active material may be adjusted within a desirable range. Accordingly, conductivity of ions or electrons of the anode active material may be improved. Additionally, the silicon-based active material may have a specific surface area in a predetermined range, and thus the conductivity and activity may be enhanced.

The lithium secondary battery of the present disclosure may be widely applied in green technology fields such as an electric vehicle, a battery charging station, a solar power generation, a wind power generation, etc., using a battery. The lithium secondary battery according to the present disclosure may be used for eco-friendly electric vehicles and hybrid vehicles to prevent climate change by suppressing air pollution and greenhouse gas emission.

These and other features and advantages of the present invention will become better understood from the following drawings and detailed description of specific example embodiments of the present disclosure.

DETAILED DESCRIPTION OF THE EMBODIMENTS

According to embodiments of the present disclosure, an anode active material for a lithium secondary battery (hereinafter, that may be abbreviated as an anode active material) including a silicon-containing active material that includes a carbon-coating is provided.

According to embodiments of the present disclosure, a lithium secondary battery including the anode active material is provided.

Hereinafter, the anode active material and the lithium secondary battery according to the present disclosure will be described in more detail with reference to embodiments and accompanying drawings. However, those skilled in the art will appreciate that such embodiments are provided to further understand the present invention and do not limit the subject matters to be protected as disclosed in the detailed description and appended claims.

Figure 1:
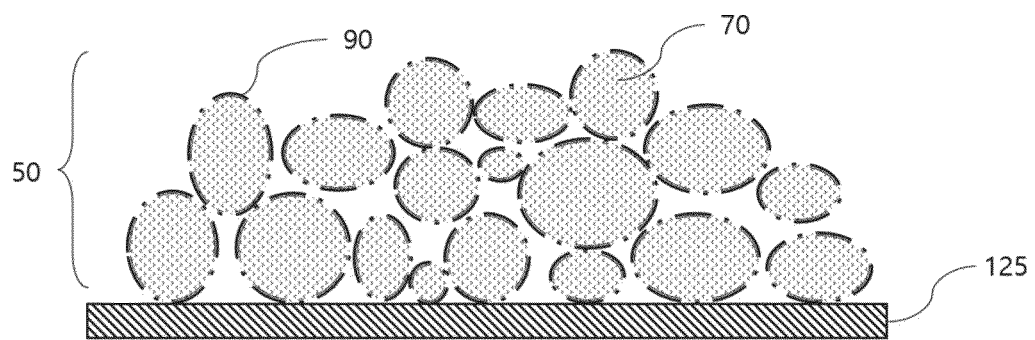
FIG. 1 is a schematic cross-sectional view illustrating an anode with an anode active material on the anode for a lithium secondary battery in accordance with embodiments of the present disclosure.

FIG. 1 is a schematic cross-sectional view illustrating an anode for a lithium secondary battery in accordance with embodiments of the present disclosure.

Referring to FIG. 1, an anode for a lithium secondary battery includes an anode current collector 125 and an anode active material layer formed on the anode current collector 125. The anode active material layer contains an anode active material.

In some embodiments, the anode active material layer may include a silicon-based active material (e.g., a silicon-containing active material). The silicon-based active material layer may include a silicon-based active material particles 50, each of which includes a core particle 70 and a carbon coating 90 formed over or on the core particle 70.

The core particle 70 may include silicon (Si), a silicon oxide (SiOx) (0<x<2), or a silicon-metal alloy. These may be used alone or in a combination of two or more therefrom. An anode activity may be provided by the core particle 70.

In one embodiment, the silicon oxide (SiOx, 0<x<2) may include a lithium compound or a magnesium compound. For example, the SiOx may be pretreated with lithium or magnesium. For example, the SiOx may include lithium silicate or magnesium silicate.

In some embodiments, the core particle 70 may include a silicon-carbon-based active material. The silicon-carbon-based active material may include, e.g., silicon carbide (SIC).

The carbon coating 90 may maintain an activity of the anode while suppressing an exposure of the core particle 70 to an electrolyte solution.

For example, repeated charging/discharging of a secondary battery may damage the surface of the core particle 70. The damage may be mechanical and/or chemical in nature. Further, gas generation may be caused by side reactions when the surface of the core particle 70 contacts the electrolyte solution.

The carbon coating 90 may suppress swelling and expansion of the core particle 70 due to repeated charging and discharging, and may prevent the side reactions with the electrolyte solution, thereby improving life-span properties and capacity retention of the anode.

In one embodiment, the carbon coating 90 may be formed by a chemical vapor deposition (CVD), a physical vapor deposition (PVD), or a thermal deposition of a hydrocarbon gas or a coal-based material over or on the core particle 70. For example, the carbon coating 90 may be formed over or on the core particle 70 using a hydrocarbon such as methane, ethylene or acetylene, or a coal-based material such as pitch or coal tar.

In some embodiments, the carbon coating 90 may include an amorphous carbon or a crystalline carbon.

For example, the carbon coating 90 may include the amorphous carbon such as hard carbon, soft carbon, fired coke, mesophase pitch carbon, and the crystalline carbon such as natural graphite and artificial graphite. These may be used alone or in a combination of two or more therefrom.

In one embodiment, the carbon coating 90 may include the amorphous carbon, e.g., hard carbon and/or soft carbon. The amorphous carbon may be structurally stable, and may participate in a reaction even in a low state of charge (SOC) region where the silicon-based active material mainly reacts. Thus, deterioration of the silicon-based active material due to charging/discharging may be suppressed.

At least a portion of an outer surface of the core particle 70 may be surrounded by the carbon coating 90. For example, the carbon coating 90 may be formed continuously on the outer surface of the core particle 70, and may exist in the form of a film covering the outer surface of the core particle 70.

In one embodiment, the carbon coating 90 may be partially formed on the outer surface of the core particle 70. For example, the carbon coating 70 may cover 30% or more, or 50% or more of the surface area of the core particle 90. Within the above range, the exposure of the core particle 70 may be substantially reduced to prevent physical damage, thereby structurally stabilizing the anode active material and improving life-span properties of the secondary battery.

In some embodiments, the carbon coating 90 may cover all or substantially all outer surface of the core particle 70. For example, the carbon coating 90 may entirely cover the core particle 70.

In one embodiment, the carbon coating 90 may be discontinuously distributed over or on the core particle 70. For example, the carbon coating 90 may exist in an island form in a local area of the outer surface of the core particle 70.

When the carbon coating 90 is uniformly distributed on the surface of the core particle 70, lithium ions may be intercalated and de-intercalated from all surfaces of the anode active material. Accordingly, power and rapid charging properties may be improved.

A coating uniformity of a surface shape of the core particle 70 may affect the power properties of the secondary battery. The coating uniformity of the surface of the core particle 70 may be measured by a Raman R ($I_D/I_G$) value.

In some embodiments, a thickness of the carbon coating 90 may be in a range from about 0.001 μm to about 0.5 μm. In one embodiment, the thickness of the carbon coating 90 may be in a range from about 0.001 μm to about 0.3 μm, or from about 0.001 μm to about 0.1 μm. Within the above range, physical damages and structural collapse of the core particles 70 due to repeated charging and discharging may be prevented while maintaining high capacity and high rate properties of the secondary battery.

For example, the thickness of the carbon coating 90 may be measured using a scanning electron microscope (SEM), a transmission electron microscope (TEM), etc.

In some embodiments, a density of the carbon coating 90 may be in a range from 1.2 g/cm³ to 1.6 g/cm³. Within this range, the carbon coating 90 may suppress the physical damages to the core particle 70 due to a volume expansion, and the silicon-based active material may be structurally stabilized.

In some embodiments, a content of the carbon coating 90 may be in a range from 1 weight percent (wt %) to 10 wt %, or from 1 wt % to 5 wt % based on a total weight of the silicon-based active material. Within this range, the carbon coating 90 may entirely cover the core particle 70 with an appropriate thickness, and damages due to a volume change of the core particle 70 may be suppressed. Additionally, resistance and electrochemical properties of an electrode may be improved by preventing a contact loss due to charging/discharging of the secondary battery.

The content of the carbon coating 90 may be measured using a thermogravimetric analysis (TGA). For example, the content of the carbon coating 90 may be calculated by measuring a change of a weight by a heat treatment and an injection of nitrogen ($N_2$) gas.

The silicon-based active material may include silicon having a crystalline structure (c-Si). The crystalline structure refers to a structure where a shape of a silicon positioned inside a particle has crystallinity or silicon atoms are regularly arranged.

In some embodiments, a silicon crystallite size measured by an X-ray diffraction (XRD) analysis of the silicon-based active material may be greater than 0 nm and less than or equal to 7 nm, for example, in a range from 0.1 nm to 7.0 nm, from 3.0 nm to 7.0 nm, from 3.0 nm to 5.0 nm, or from 4.0 nm to 5.0 nm.

If the crystallite size of silicon is greater than 7 nm, cracks of the silicon-based active material may be increased during a pressing process or a charging/discharging process. Accordingly, the capacity retention may be lowered, thereby degrading the life-span properties of the secondary battery. Further, a moving distance of lithium ions in the silicon-based active material may be increased, thereby degrading the initial power properties.

In some embodiments, the crystallite size of silicon may be calculated using a Scherrer equation represented as Equation 4 below using a full width at half maximum (FWHM) obtained by the XRD analysis.

$$L = \frac{0.9\lambda}{\beta\cos\theta} \qquad \text{[Equation 4]}$$

In Equation 4 above, L represents a crystallite size (nm), λ represents an X-ray wavelength (nm), θ represents a diffraction angle (rad), and β represents a full width at half maximum (rad) of a corresponding peak at the diffraction angle. In some embodiments, the full width at half maximum in the XRD analysis for measuring the crystallite size may be measured from a peak of a (111) plane or a (220) plane of silicon.

In some embodiments, a full width at half maximum (FWHM) in which a value derived from an instrument is corrected may be used as β in Equation 4 above. In an embodiment, Si may be used as a reference material to reflect the instrument-derived value. In this case, the instrument-derived FWHM may be expressed as a function of 2θ by fitting the FWHM profile in an entire 2θ range of Si. Thereafter, a value from which the instrument-derived FWHM value at the corresponding 2θ obtained from the function is corrected may be used as β.

In some embodiments, the silicon-based active material may include an amorphous structure (a-Si). The amorphous structure may refer to a structure in which the shape of a silicon positioned in the particle is amorphous or the crystallite size is small non-measurably from the Scherrer equation represented by Equation 4.

Ratios of the crystallite size of silicon, a crystalline region and an amorphous region may be maintained within an appropriate range by the amorphous structure. Accordingly, life-span properties may be improved while maintaining the capacity properties of the silicon-based active material.

In the anode active material according to embodiments of the present disclosure, $S_A$ defined by Equation 1 below may be in a range from 1.0 to 1.5. For example, stability of the silicon-based active material may be quantitatively measured by the $S_A$.

$$S_A = Cs \times (I_C/I_A) \quad \text{[Equation 1]}$$

In Equation 1, Cs is a numerical value of the crystallite size of silicon (nm) of the silicon-based active material obtained by the XRD analysis. For example, Cs may be a value obtained by removing a unit from the crystallite size of silicon of the silicon-based active material measured in a nm unit.

In a Raman spectrum obtained by Raman spectroscopy, $I_C$ may be a peak intensity corresponding to a crystalline region (e.g., a region having a crystalline Si structure) of the silicon-based active material, and $I_A$ may be a peak intensity corresponding to an amorphous region (e.g., a region having an amorphous Si structure).

For example, a ratio of the crystalline region in the silicon-based active material may be calculated from $I_C$, and a ratio of the amorphous region in the silicon-based active material may be calculated from $I_A$.

For example, $I_C$ is a maximum value of a peak intensity measured at a Raman shift from 500 $cm^{-1}$ to 530 $cm^{-1}$, from 505 $cm^{-1}$ to 530 $cm^{-1}$, or from 510 $cm^{-1}$ to 530 $cm^{-1}$ in the Raman spectrum.

For example, $I_A$ is a maximum value of a peak intensity measured in a Raman shift from 450 $cm^{-1}$ to 495 $cm^{-1}$, 460 $cm^{-1}$ or more and less than 490 $cm^{-1}$, or from 465 $cm^{-1}$ to 485 $cm^{-1}$ in the Raman spectrum.

If $S_A$ is greater than 1.5, the crystallite size of silicon and the ratio of c-Si may increase, and cracks of particles may occur in the pressing process to reduce the life-span properties of the secondary battery.

If $S_A$ is less than 1.0, the amorphous region or microcrystals in the silicon-based active material may increase, and a reaction volume of the anode active material may be increased. Accordingly, a contact area with the electrolyte solution may be increased to degrade structural stability of the anode active material. For example, the side reaction between the electrolyte solution and the anode active material may be increased to cause cracks and fractures on the surface of the anode active material. Further, a reversible capacity of the anode active material may be decreased, thereby degrading initial efficiency and capacity properties.

In one embodiment, $S_A$ may be in a range from 1.0 to 1.3. Within the above range, structural stability and power properties of the anode active material may be further improved.

In the Raman spectroscopy analysis of the silicon-based active material, the $I_C/I_A$ value may be calculated from a maximum value of a peak intensity present in a range from 500 $cm^{-1}$ to 530 $cm^{-1}$ and a maximum value of a peak intensity present in a range from 450 $cm^{-1}$ to 495 $cm^{-1}$.

For example, as the value of $I_C/I_A$ becomes larger, a growth of the c-Si may be promoted relatively to the a-Si in the silicon-based active material. As the value of $I_C/I_A$ becomes smaller, the growth of the c-Si may be suppressed relatively to the a-Si.

The value of $I_C/I_A$ may be adjusted so that a content of the c-Si may be increased or decreased. For example, as the $I_C/I_A$ increases and the content of the c-Si in the silicon-based active material increases, the volume change during charging/discharging may be increased to decrease the life-span properties of the secondary battery.

In some embodiments, $I_C/I_A$ may be greater than 0 and less than or equal to 0.4. Within the above range, a content of the a-Si may be increased to suppress the volume expansion and degradation of the anode active material during charging/discharging. In one embodiment, $I_C/I_A$ may be greater than 0 and less than or equal to 0.35, or greater than 0 and less than or equal to 0.30.

In some embodiments, $S_B$ defined by Equation 2 may be in a range from 0.10 to 0.30, from 0.10 to 0.20, or from 0.10 to 0.14. For example, packing properties or reactivity of the silicon-based active material may be quantitatively measured by the $S_B$.

$$S_B = SPAN^2/SSA \quad \text{[Equation 2]}$$

In Equation 2, SPAN represents $(D_{90}-D_{10})/D_{50}$. $D_{50}$ is a volumetric average particle diameter of the silicon-based active material. For example, $D_{50}$ is a particle diameter at a volume fraction of 50% in a volume-weighted particle size distribution of the silicon-based active material. $D_{10}$ is a particle diameter at a volume fraction of 10% in the volume-weighted particle size distribution of the silicon-based active material. $D_{90}$ is a particle diameter at a volume fraction of 90% in the volume-weighted particle size distribution of the silicon-based active material.

The term "particle size" or "particle diameter" used herein may refer to the longest diameter of any particle. The particle diameter may be measured using a scanning electron microscope (SEM), a transmission electron microscope (TEM), a light scattering method, or a laser diffraction method.

SSA is a numerical value of a specific surface area of the silicon-based active material. For example, SSA may refer to a dimensionless value obtained by removing a unit from a specific surface area of the silicon-based active material measured in a unit of $m^2/g$.

Within the $S_B$ range, uniformity of the active material layer and packing density of the anode active material may be appropriately adjusted to control a thickness change of the anode and to prevent degradation of the silicon-based active material during charging and discharging.

In some embodiments, $D_{50}$ of the silicon-based active material may be 6 µm or less, e.g., in a range from 2 µm to 5 µm.

In some embodiments, $D_{10}$ of the silicon-based active material may be 4 µm or less, e.g., greater than 0 µm and less than 3 µm or less.

In some embodiments, $D_{90}$ of the silicon-based active material may be 7.5 µm or less, e.g., for example, 5 µm to 7 µm.

In some embodiments, SPAN may be in a range from 0.1 to 3.0. If SPAN exceeds 3.0, the particle diameter distribution may become wide. In this case, uniformity of the active material layer in the anode including the silicon-based active material may be degraded due to repeated charging/discharging, and a thickness change of the anode may be increased.

If SPAN is less than 0.1, the particle size distribution may become narrow and the particle diameter may become substantially constant. Accordingly, a packing density of the anode active material may be lowered, thereby increasing the thickness change of the anode, and a contact between the anode active materials may become poor to degrade the life-span properties.

In an embodiment, the SPAN may be in a range from 0.1 to 2.5, or from 0.1 to 2.0.

In some embodiments, the silicon-based active material may have the specific surface area of 5 m$^2$/g to 9 m$^2$/g. For example, the specific surface area may be measured using a Brunauer-Emmett-Teller (BET) measurement method from a nitrogen gas adsorption amount with a specific surface area measuring apparatus.

If the specific surface area of the silicon-based active material is 9 m$^2$/g or less, the contact between the electrolyte and the silicon-based active material may be reduced to suppress the side reaction and gas generation, and mechanical and structural stability of the silicon-based active material may be improved.

In one embodiment, the specific surface area of the silicon-based active material may be in a range from about 6 m$^2$/g to about 9 m$^2$/g, or from about 7 m$^2$/g to about 9 m$^2$/g. Within the above range, cycle properties may be improved while enhancing intercalation and de-intercalation of lithium ions, thereby improving charging/discharging capacity and rapid charging performance.

In some embodiments, peaks of a D band and a G band may be present or expressed in the Raman spectrum of the silicon-based active material.

The D band is a peak from a vibration mode having a symmetry and may not be observed in a perfect lattice structure. The D band may appear, e.g., when a hexagonal structure is not widely developed or the hexagonal structure is defective in the silicon-based active material. The G band is a peak appearing in a crystalline carbon material, and may be present when, e.g., carbon atoms forming the hexagonal structure are present in the silicon-based active material.

For example, the Raman spectroscopy may be performed by selecting a predetermined region for the silicon-based active material and using a Raman mapping of a Raman spectrometer for the region.

The Raman spectroscopy may be performed by arbitrarily designating 100 to 5000 regions for the silicon-based active material, and an area of each region may have a size of (30 μm to 50 μm)×(30 μm to 75 μm).

In one embodiment, a mapping interval for the Raman mapping may be set to, e.g., about 1 μm to about 10 μm with respect to an x-axis, and about 1 μm to about 5 μm with respect to a y-axis.

A laser wavelength of the Raman spectroscope may be, e.g., in a range from about 532 nm to about 785,633 nm, a laser power may be in a range from about 5 mW to about 90 mW, a laser exposure time may be in a range from about 3 seconds to about 20 seconds, and the number of scans may be from 1 to 5.

The carbon atoms included in the carbon coating 90 may form a predetermined bonding structure. For example, the carbon coating 90 may include a hexagonal structure by sp$^2$ bonds where each carbon atom forms an angle of about 120° with adjacent three carbon atoms on the same plane, or a tetrahedral structure by sp$^3$ bonds where each carbon atom forms an angle of about 109.5° with four adjacent carbon atoms.

The crystalline carbon and the amorphous carbon may include the sp$^2$ bond or the sp$^3$ bond in different ratios. Thus, a peak intensity ($I_G$) of the G band, a peak intensity ($I_D$) of the D band, and $I_D/I_G$ may become different depending on contents of the crystalline carbon and the amorphous carbon in the carbon coating 90.

In the anode active material described above, $S_C$ defined by Equation 3 below may be in a range from 5.5 to 6.5. For example, coating uniformity of the carbon coating 90 may be quantitatively measured by the $S_C$.

$$S_C = (I_D/I_G)/FWHM \qquad \text{[Equation 3]}$$

In Equation 3, $I_D$ is a peak intensity of the D band of the silicon-based active material obtained through the Raman spectrum, and $I_G$ is a peak intensity of the G band.

$I_D$ is a peak intensity for a wavenumber region from about 1,300 cm$^{-1}$ to about 1,420 cm$^{-1}$ in the Raman spectrum, and $I_G$ is a peak intensity for a wavenumber region from about 1,540 cm$^{-1}$ to about 1,620 cm$^{-1}$. $I_D$ and $I_G$ refer to maximum values of the peak intensities measured in the above-described wavenumber regions.

FWHM is a numerical value of a full width at half maximum at 520±5 cm$^{-1}$ in the Raman spectrum of the silicon-based active material obtained through the Raman spectroscopy.

In the above $S_C$ range, coating uniformity of the carbon coating 90 may be improved. Thus, mobility of lithium ions through the surface of the silicon-based active material may be further improved, and charging/discharging, power and life-span properties may be improved. Additionally, physical damages such as cracks and fractures in the core particle 70 due to charging/discharging or pressing processes of secondary battery may be reduced or prevented. Therefore, structural safety of the silicon-based active material may be improved, and capacity retention properties of the secondary battery may also be improved.

In some embodiments, the anode active material may further include a carbon-based active material. For example, the anode active material may further include the carbon-based active material particles that are distinct from the silicon-based active material particles. For example, the anode active material above may include a mixture of the silicon-based active material and the carbon-based active material.

In some embodiments, the carbon-based active material may include an amorphous carbon such as fired coke, mesophase pitch carbide, hard carbon and soft carbon and/or a crystalline carbon such as natural graphite and artificial graphite. These may be used alone or in a combination of two or more therefrom.

In an embodiment, the carbon-based active material may include the crystalline carbon such as artificial graphite or natural graphite. For example, the crystalline carbon has a relatively high discharge capacity and life-span properties, thereby improving an energy density of the secondary battery. Additionally, natural graphite and artificial graphite which are thermally and chemically stable may be used so that high-temperature storage and high-temperature life-span properties of the battery may be improved.

In one embodiment, a crystallinity of the carbon coating 90 may be less than that of the carbon-based active material.

For example, a carbon precursor may be fired at a high temperature of 900° C. or higher so that the carbon-based active material may have a relatively high crystallinity.

In some embodiments, a content of the silicon-based active material may be greater than 0 wt % and less than or equal to 10 wt %, from 1 wt % to 10 wt %, from 1 wt % to 7 wt %, or from 2 wt % to 6 wt % based on a total weight of the anode active material. Within the above range, expansion of the anode active material and a short circuit in the electrode may be suppressed, and life-span and capacity recovery ratio may be improved.

Figure 2:
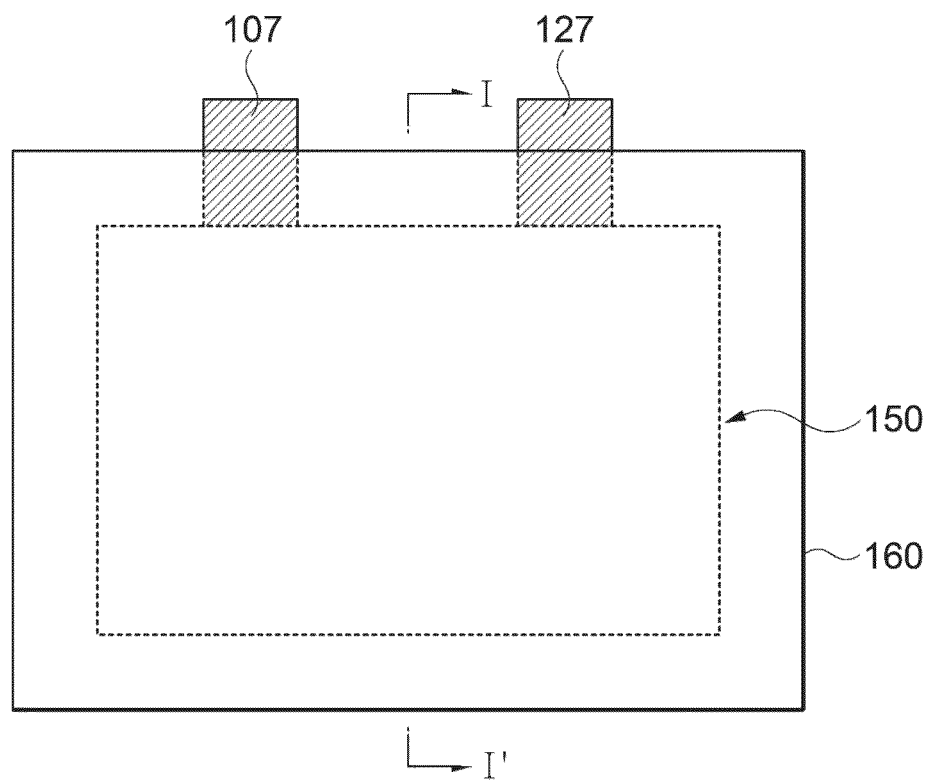
FIG. 2 is a schematic plan view illustrating a lithium secondary battery in accordance with embodiments of the present disclosure.
Figure 3:
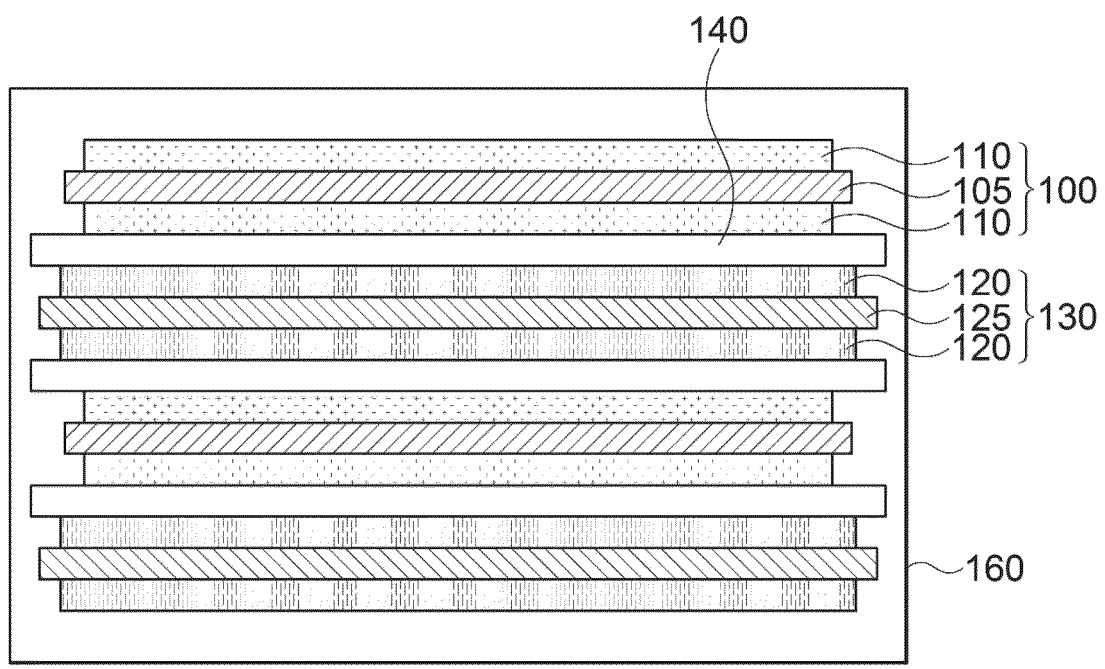
FIG. 3 is a schematic cross-sectional view illustrating a lithium secondary battery in accordance with embodiments of the present disclosure.

FIG. 2 and FIG. 3 are a schematic plan view and a schematic cross-sectional view, respectively, of a secondary battery according to embodiments of the present disclosure, respectively. For example, FIG. 3 is a cross-sectional view taken along a line I-I' shown in FIG. 2 in a thickness direction of the secondary battery. For convenience of descriptions, illustrations of a cathode, an anode and a separator are omitted in FIG. 2.

Referring to FIGS. 2 and 3, the secondary battery may include a cathode 100, an anode 130, and a separator 140.

In some embodiments, the secondary battery may be provided as a lithium secondary battery.

The cathode 100 may include a cathode current collector 105 and a cathode active material layer 110 formed on at least one surface of the cathode current collector 105. In some embodiments, the cathode active material layer 110 may be formed on both surfaces (e.g., an upper surface and a lower surface) of the cathode current collector 105. For example, the cathode active material layer 110 may be formed on each of the upper surface and the lower surface of the cathode current collector 105.

The cathode current collector 105 may include, e.g., stainless steel, nickel, aluminum, titanium, copper, or an alloy thereof. In one embodiment, the cathode current collector 105 may include aluminum or an aluminum alloy.

The cathode active material layer 120 may include a cathode active material, a binder and/or a conductive material. For example, a cathode slurry may be prepared by mixing and stirring the cathode active material with the binder and/or the conductive material in a solvent. The cathode slurry may be coated on the cathode current collector 105, and then dried and pressed to form the cathode active material layer 110.

Examples of the cathode active material may include a lithium iron phosphate-based compound, a lithium cobalt-based oxide, a lithium manganese-based oxide, a lithium nickel-based oxide, a lithium composite oxide, etc.

For example, the cathode active material may include a layered compound such as lithium cobalt oxide ($LiCoO_2$) or lithium nickel oxide ($LiNiO_2$), a lithium manganese oxide such as $LiMnO_3$, $LiMn_2O_3$ and $LiMnO_2$, lithium copper oxide ($Li_2CuO_2$), a vanadium oxide such as $LiV_3O_8$, $LiFe_3O_4$, $V_2O_5$ and $CuzVO_7$, a lithium iron phosphate oxide such as $LiFePO_4$, etc.

In some embodiments, the cathode active material may include a compound represented by Chemical Formula 1.

[Chemical Formula 1]

In Chemical Formula 1, 0.95≤a≤1.08, b≥0.5, and M may include at least one element of Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba and Sr.

In an embodiment, the cathode active material above may further include at least one of cobalt (Co) and manganese (Mn). For example, a nickel-cobalt-manganese (NCM)-based lithium oxide may be used as the cathode active material.

Nickel (Ni) may be provided as a metal related to the capacity of the lithium secondary battery. As a content of nickel increases, capacity and power of the lithium secondary battery may be increased. However, an excessively high content of Ni may be disadvantageous from aspects of mechanical and electrical stability.

Conductivity or resistance of the lithium secondary battery may be improved by cobalt (Co), and mechanical and electrical stability of the lithium secondary battery may be improved by manganese (Mn).

The chemical structure represented by Chemical Formula 1 represents a lattice structure of the cathode active material or a bonding relationship included in the crystal structure, and does not exclude introduction of an additional element. For example, M may serve as a main active element of the cathode active material. Chemical Formula 1 is provided to express the bonding relationship of the main active element and is to be interpreted as encompassing the introduction and substitution of the additional element.

In an embodiment, an auxiliary element may be further included in addition to the main active element to improve the chemical stability of the cathode active material or the crystal structure. The auxiliary element may be mixed together in the crystal structure to form a bond, and this case should be understood to be included within a range of the chemical structure represented by Chemical Formula 1.

The binder may include a vinylidene fluoride-hexafluoropropylene copolymer (PVDF-co-HFP), polyvinylidene fluoride (PVDF), polyacrylonitrile, polymethylmethacrylate, polyvinyl alcohol, polyvinylpyrrolidone, polyethylene, polypropylene, polyacrylic acid, styrene-butadiene rubber (SBR), etc., and may be used together with a thickener such as carboxymethyl cellulose (CMC).

For example, a PVDF-based binder may be used as a binder for forming the cathode. Accordingly, a content of the binder for forming the cathode active material layer 110 may be reduced, and the content of the cathode active material may be relatively increased, thereby improving the power and capacity of the secondary battery.

The conductive material may include a carbon-based conductive material such as graphite, carbon black, a carbon nanofiber and carbon nanotube and/or a metal-based conductive material such as tin, tin oxide, zinc oxide, titanium oxide and a metal fiber.

In some embodiments, an electrode density of the cathode 100 may be in a range from 3.0 g/cc to 3.9 g/cc, and may be in a range from 3.2 g/cc to 3.8 g/cc.

The anode 130 may include an anode current collector 125 and an anode active material layer 120 formed on at least one surface of the anode current collector 125. In some embodiments, the anode active material layer 120 may be formed on both surfaces (e.g., upper surface and lower surface) of the anode current collector 125.

The anode active material layer 120 may be coated on both the upper and lower surfaces of the anode current collector 125. For example, the anode active material layer 120 may directly contact the surface of the anode current collector 125.

The anode current collector 125 may include gold, stainless steel, nickel, aluminum, titanium, copper, or an alloy thereof. In one embodiment, the anode current collector 125 may include copper or a copper alloy.

In some embodiments, the anode active material layer 120 may include the anode active material according to the above-described embodiments. For example, the anode active material may be mixed and stirred with a binder, a conductive material, and/or a dispersive agent in a solvent to prepare an anode slurry. The anode slurry may be coated on the anode current collector 125, and then dried and pressed (rolled) to form the anode active material layer 120.

Materials substantially the same as or similar to materials used to form the cathode 100 may be used as the binder and the conductive material. In some embodiments, the binder for forming the anode may include, e.g., styrene-butadiene rubber (SBR) or an acrylic binder for compatibility with a graphite-based active material and may be used together with a thickener such as carboxymethyl cellulose (CMC).

In some embodiments, an electrode density of the anode 130 may be in a range from 1.0 g/cc to 1.9 g/cc.

In some embodiments, an area (e.g., a contact area with the separator 140) and/or a volume of the anode 130 may be greater than an area and/or a volume of the cathode 100. Accordingly, lithium ions generated from the cathode 100 may be easily transferred to the anode 130 without, e.g., being precipitated, thereby further improving output power and capacity properties.

The separator 140 may be interposed between the cathode 100 and the anode 130. The separator 140 may include a porous polymer film formed of a polyolefin-based polymer such as an ethylene homopolymer, a propylene homopolymer, an ethylene/butene copolymer, an ethylene/hexene copolymer, an ethylene/methacrylate copolymer, etc. The separator 140 may include a non-woven fabric formed of a glass fiber having a high melting point, a polyethylene terephthalate fiber, etc.

The separator 140 may extend in a length direction between the cathode 100 and the anode 130. A plurality of the cathodes 100 and the anodes 130 may be stacked using the separator 140 in the thickness direction.

In some embodiments, an electrode cell may be defined by the cathode 100, the anode 130 and the separator 140, and a plurality of electrode cells may be stacked to form an electrode assembly 150. For example, the electrode assembly 150 may be formed by winding, stacking, folding, etc. of the separator 140.

The electrode assembly 150 may be accommodated in a case 160, and an electrolyte solution may also be injected into the case 160. The case 160 may include, e.g., a pouch, a can, etc.

In some embodiments, a non-aqueous electrolyte solution may be used as the electrolyte solution.

The non-aqueous electrolyte solution may include a lithium salt as an electrolyte and an organic solvent. The lithium salt may be represented by $Li^+X^-$, and examples of an anion ($X^-$) of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125 included in each electrode cell, respectively, to one side of the case 160. The electrode tabs may be fused together with the one side of the case 160, and may be connected to electrode leads (a cathode lead 107 and an anode lead 127) being exposed or extending to an outside of the case 160.

FIG. 2 illustrates that the cathode lead 107 and the anode lead 127 are formed at the same side of the lithium secondary battery or the case 160, but the cathode lead 107 and the anode lead 127 may be formed at opposite sides. For example, the cathode lead 107 may be formed at one end of the case 160, and the anode lead 127 may be formed at the other end of the case 160.

The lithium secondary battery may be manufactured in, for example, a cylindrical type using a can, a prismatic type, a pouch type, a coin type, etc.

The lithium secondary battery includes the anode active material as described above to have improved cycle properties, long-term storage stability, and charge/discharge capacity. Additionally, e.g., the crystallinity and the specific surface area of the silicon-based active material may be controlled to improve conductivity of ions or electrons. Side reactions between the anode active material and the electrolyte solution may be suppressed, and degradation of the capacity and power of the battery may be prevented.

Hereinafter, preferred examples are proposed to more concretely describe the embodiments of the present disclosure. However, the following examples are only given for illustrating the present invention and those skilled in the related art will understand that various alterations and modifications are possible within the scope and spirit of the present invention. Such alterations and modifications are duly included in the appended claims. Furthermore, the embodiments may be combined to form additional embodiments.

Examples and Comparative Examples

1. Preparation of Anode Active Materials (A-1 to A-8)

A methane or an ethylene gas as a hydrocarbon gas was subjected to chemical vapor deposition (CVD) treatment on a silicon core (SiOx), and a carbonization was performed in an atmosphere of 950° C. or 1050° C. to prepare silicon-based active materials A-1 to A-8 having a carbon coating.

Physical properties of the silicon-based active material on which the carbon coating was formed were analyzed.

Each silicon-based active material of A-1, A-2, and A-5 to A-8 satisfying the physical properties of Table 1 and a carbon-based active material were mixed in a weight ratio of 3:97 to prepare the anode active material.

The silicon-based active material A-3 satisfying the physical properties of Table 1 and the carbon-based active material were mixed in a weight ratio of 5:95 to prepare an anode active material.

The silicon-based active material A-4 satisfying the physical properties of Table 1 and the carbon-based active material were mixed in a weight ratio of 10:90 to prepare an anode active material.

2. Measurement of Si Crystallite Size

For each of the silicon-based active materials A-1 to A-8, a peak value was obtained by designating 2θ value from 5° to 80° under conditions of 45 kV and 40 mA using a Cu X-ray source. A Si crystallite size ($C_s$) was calculated by a deconvolution for a crystalline peak and an amorphous peak from the obtained peak values.

3. Measurement of Ratio of c-Si Intensity to a-Si Intensity ($I_C/I_A$)

A Raman spectroscopy analysis was performed on each of the silicon-based active materials A-1 to A-8 to obtain Raman spectra. A c-Si peak and an a-Si peak were measured by designating Raman shifts 520 cm$^{-1}$ and 470 cm$^{-1}$, respectively, as reference points. $I_C/I_A$ was calculated by performing deconvolution after shifting the measured values based on a center (1,000 cm$^{-1}$).

4. Measurement of Content of Carbon Coating

Each of the silicon-based active materials A-1 to A-8 was put into a holder and weighed. A nitrogen (N$_2$) gas was injected into the holder while performing a heat treatment from room temperature (25° C.) to a measurable range (1,000° C.), and a weight change was measured. Thereafter, a carbon ratio was calculated through the weight change of the input sample excluding the holder.

5. Measurement of Specific Surface Area

Each specific surface area of the silicon-based active materials A-1 to A-8 was measured by a BET method using a nitrogen gas adsorption amount with a specific surface area measuring apparatus (BELSORP-mino II). Specifically, the silicon-based active material was heated to 200° C. using a pretreatment device, and then exposed to a nitrogen gas for 60 minutes. A weight of the sample containing the holder was recorded, and a weight of only the sample to be measured was input. The specific surface area was measured after adding an appropriate amount (baseline) of a liquid nitrogen.

6. Measurement of Volume-Based Particle Size Distribution

Each of the silicon-based active materials A-1 to A-8 was dispersed in a dispersion medium (10 wt % water dispersion of sodium hexametaphosphate ((NaPO$_3$)$_6$), and then a diffraction pattern difference according to a particle size was measured using a laser diffraction particle size analyzer (Microtrac MT 3000). $D_{10}$, $D_{50}$ and $D_{90}$ were measured by calculating particle diameters at points where a volume fraction became 10%, 50% and 90% in a measured volume-weighted particle size distribution curve.

7. Measurement of $I_D/I_G$ and FWHM

For each of the silicon-based active materials A-1 to A-8, 3000 regions having a size of 30 μm×30 μm were randomly designated. Each region was exposed to a laser having a wavelength of about 550 nm for 10 seconds at a power of 10 mW, and scanned to obtain a Raman spectrum. A ratio ($I_D/I_G$) of a peak intensity ($I_D$) at 1360 cm$^{-1}$ to a peak intensity ($I_G$) at 1560 cm$^{-1}$ was measured, and a full width at half maximum (FWHM) around 520 cm$^{-1}$ was measured from the Raman spectrum.

TABLE 1

|  | $C_s$ (nm) | $I_C/I_A$ | content of carbon coating (wt %) | specific surface area (m$^2$/g) | $D_{10}$ (μm) | $D_{50}$ (μm) | $D_{90}$ (μm) | $I_D/I_G$ | FWHM |
|---|---|---|---|---|---|---|---|---|---|
| Example 1 (A-1) | 4.90 | 0.23 | 2.4 | 7.35 | 2.90 | 4.57 | 6.95 | 1.43 | 0.22 |
| Example 2 (A-2) | 4.8 | 0.26 | 2.3 | 4.35 | 3.21 | 5.21 | 7.64 | 1.44 | 0.23 |
| Example 3 (A-3) | 4.6 | 0.25 | 2.8 | 2.20 | 3.85 | 4.89 | 7.82 | 1.21 | 0.21 |
| Example 4 (A-4) | 4.1 | 0.31 | 2.5 | 6.21 | 3.64 | 5.05 | 8.21 | 1.34 | 0.14 |
| Comparative Example 1 (A-5) | 4.30 | 0.54 | 1.90 | 1.80 | 3.78 | 5.72 | 8.53 | 0.95 | 0.12 |
| Comparative Example 2 (A-6) | 5.60 | 0.71 | 2.90 | 5.16 | 3.74 | 5.83 | 8.88 | 1.40 | 0.24 |
| Comparative Example 3 (A-7) | 3.60 | 0.42 | 3.30 | 1.50 | 3.33 | 5.03 | 7.44 | 0.84 | 0.10 |
| Comparative Example 4 (A-8) | 4.9 | 0.31 | 2.1 | 2.21 | 3.99 | 5.10 | 8.84 | 0.95 | 0.18 |

Table 1 shows the physical properties of the silicon-based active material included in the anode active material according to each of Examples and Comparative Examples.

For example, the anode active material according to Example 1 is a mixture of the silicon-based active material A-1 and the carbon-based active material in a weight ratio of 3:97.

Values of SPAN, $S_A$, $S_B$ and $S_C$ of the anode active material were calculated and shown in Table 2.

TABLE 2

|  | SPAN | $S_A$ | $S_B$ | $S_C$ |
|---|---|---|---|---|
| Example 1 (A-1) | 0.89 | 1.13 | 0.11 | 6.50 |
| Example 2 (A-2) | 0.85 | 1.25 | 0.17 | 6.26 |
| Example 3 (A-3) | 0.81 | 1.15 | 0.30 | 5.76 |
| Example 4 (A-4) | 0.90 | 1.27 | 0.13 | 9.57 |
| Comparative Example 1 (A-5) | 0.83 | 2.32 | 0.38 | 7.92 |
| Comparative Example 2 (A-6) | 0.88 | 3.98 | 0.15 | 5.83 |
| Comparative Example 3 (A-7) | 0.82 | 1.51 | 0.45 | 8.40 |
| Comparative Example 4 (A-8) | 0.95 | 1.52 | 0.41 | 4.94 |

8. Fabrication of Lithium Secondary Battery

The anode active material, carbon nanotube (CNT) as a conductive material and polyacrylic acid (PAA) as a binder were mixed in a weight ratio of 80:10:10 to prepare an anode slurry. The anode slurry was coated on a Cu foil, dried and pressed to manufacture an anode with a mixture density of 3 mg/cm² (based on a cross-section) and 1.42 g/cc.

A coin cell type secondary battery was manufactured using a Li-foil as a counter electrode and using a 1.0M $LiPF_6$ solution that included 1 wt % of FEC (using a mixed solvent of EC:EMC; 3:7 volume ratio) as an electrolyte solution. The secondary battery was left at room temperature (25° C.) for 12 hours.

Experimental Example (1) Evaluation on Life-Span Property

The secondary batteries according to Examples and Comparative Examples were charged (CC/CV, 0.1 C, lower limit voltage 0.005V, cut-off current 0.01 C) and discharged (CC, 0.1 C, upper limit voltage 1.5V cut-off) at 25° C. as a single cycle and an initial cycle. Thereafter, charging/discharging was repeated 300 times based on a current density of 1 C to measure a discharge capacity. A life-span property was evaluated as a percentage of a discharge capacity at the 300th cycle relative to a capacity at the initial cycle.

(2) Evaluation on High Temperature Life-Span

The secondary batteries according to Examples and Comparative Examples were charged (CC/CV, 0.1 C, lower limit voltage 0.005V, cut-off current 0.01 C) and discharge (CC, 0.1 C, upper limit voltage 1.5V cut-off) at 45° C. as a single cycle and an initial cycle. Thereafter, charging/discharging was repeated 600 times with a 10-minute interval to measure a discharge capacity. A high-temperature life-span property was evaluated as a percentage of a discharge capacity at the 600th cycle relative to a capacity at the initial cycle.

(3) Evaluation on Power Property

For the secondary batteries according to Examples and Comparative Examples, charge (CC/CV, 0.1 C, lower limit voltage 0.005V, cut-off current 0.01 C) and discharge (CC, 0.1 C, upper limit voltage 1.5V cut-off) were performed at 25° C. to measure an initial discharge capacity. After increasing a rate to 1.0 C, charge/discharge were performed for two additional cycles. A power property was evaluated as a percentage of a discharge capacity at the 3rd cycle relative to a capacity at the 1st cycle.

(4) Evaluation on Electrode Adhesion

The secondary batteries according to Examples and Comparative Examples were subjected to a peel-off test using a 90 degree adhesive force meter (UTM) to evaluate an adhesive force.

(5) Evaluation on Electrode Resistance

An electrode resistance was measured for each anode of Examples and Comparative Examples under conditions including a current of 100 μA, a voltage range of 0.5V, and a pin contact number of 500 with Hioki XF057 Probe unit measuring apparatus.

(6) Evaluation on Initial Efficiency

Charge and discharge capacities of the secondary batteries according to Examples and Comparative Examples were measured after performing charge and by a rate of 0.1 C. The discharge capacity was measured as a ratio (%) to the charge capacity.

Evaluation results are shown in Table 3 below.

TABLE 3

|  | life-span property (%) | high-temperature life-span property (%) | power property (%) | electrode adhesion (N) | electrode resistance (mΩ · cm) | initial efficiency (%) |
|---|---|---|---|---|---|---|
| Example 1 (A-1) | 97.7 | 90.7 | 84.6 | 0.26 | 0.04 | 88.3 |
| Example 2 (A-2) | 96.8 | 90.2 | 84.6 | 0.25 | 0.04 | 88.2 |
| Example 3 (A-3) | 96.7 | 90.0 | 84.4 | 0.26 | 0.04 | 88.2 |
| Example 4 (A-4) | 96.7 | 89.9 | 84.4 | 0.25 | 0.06 | 88.1 |
| Comparative Example 1 (A-5) | 96.5 | 89.7 | 81.9 | 0.25 | 0.05 | 88.0 |
| Comparative Example 2 (A-6) | 89.7 | 89.7 | 79.8 | 0.25 | 0.07 | 87.9 |
| Comparative Example 3 (A-7) | 89.9 | 89.9 | 48.1 | 0.25 | 0.06 | 87.9 |

TABLE 3-continued

|  | life-span property (%) | high-temperature life-span property (%) | power property (%) | electrode adhesion (N) | electrode resistance (mΩ · cm) | initial efficiency (%) |
|---|---|---|---|---|---|---|
| Comparative Example 4 (A-8) | 86.1 | 84.9 | 38.6 | 0.24 | 0.08 | 86.1 |

Referring to Table 1 to Table 3, in Examples, the life-span, power and high-temperature properties of the lithium secondary battery were generally improved.

In Comparative Examples where $S_A$ of the silicon-based active material was greater than 1.5, the life-span, initial efficiency, power and high-temperature properties of the secondary battery were degraded.

What is claimed is:

1. An anode active material, comprising a silicon-based active material that comprises
   a SiOx (0<x<2) core particle; and
   a carbon coating formed on the core particle, characterized by an $S_A$ ranging from 1.0 to 1.3, wherein the $S_A$ is defined by Equation 1:

$$S_A = Cs \times (I_C/I_A) \quad \text{Equation 1}$$

wherein, in Equation 1, Cs is a numerical value of a silicon crystallite size expressed in a unit of nm of the silicon-based active material obtained by an X-ray diffraction analysis,
$I_C$ is a peak intensity corresponding to a crystalline region of the silicon-based active material obtained by a Raman spectroscopy, and
$I_A$ is a peak intensity corresponding to an amorphous region of the silicon-based active material obtained by the Raman spectroscopy,
wherein $S_B$ defined by Equation 2 is in a range from 0.1 to 0.3:

$$S_B = SPAN^2/SSA \quad \text{Equation 2}$$

wherein, in Equation 2, SPAN represents $(D_{90}-D_{10})/D_{50}$, $D_{10}$, $D_{50}$ and $D_{90}$ are particle diameters at volume fractions of 10%, 50% and 90%, respectively, in a volume-weighted particle size distribution of the silicon-based active material, and
SSA is a specific surface area in a unit of $m^2/g$ of the silicon-based active material,
wherein $S_C$ defined by Equation 3 is in a range from 5.5 to 6.5:

$$S_C = (I_D/I_G)/FWHM \quad \text{Equation 3}$$

wherein, in Equation 3, Ip is a peak intensity of a D band of the silicon-based active material obtained by a Raman spectroscopy, $I_G$ is a peak intensity of a G band of the silicon-based active material obtained by the Raman spectroscopy, and
FWHM is a numerical value of a full width at half maximum of a peak at 520 $cm^{-1}$ in a Raman spectrum obtained by the Raman spectroscopy for the silicon-based active material.

2. The anode active material for a lithium secondary battery of claim 1, wherein, in Equation 1, $I_C$ is a maximum value of peak intensities measured at a Raman shift of 500 $cm^{-1}$ to 530 $cm^{-1}$, and $I_A$ is a maximum value of peak intensities measured at a Raman shift of 450 $cm^{-1}$ to 490 $cm^{-1}$.

3. The anode active material for a lithium secondary battery of claim 1, wherein the carbon coating includes crystalline carbon, amorphous carbon, or a combination thereof.

4. The anode active material for a lithium secondary battery of claim 1, wherein a content of the carbon coating is in a range from 1 wt % to 10 wt % based on a total weight of the silicon-based active material.

5. The anode active material for a lithium secondary battery of claim 1, wherein the carbon coating covers 50% or more of an outer surface of the core particle.

6. The anode active material for a lithium secondary battery of claim 1, wherein the silicon crystallite size of the silicon-based active material is in a range from 3.0 nm to 7.0 nm.

7. The anode active material for a lithium secondary battery of claim 1, wherein $I_C/I_A$ in Equation 1 is greater than 0, and less than or equal to 0.4.

8. The anode active material for a lithium secondary battery of claim 1, wherein the SSA is in a range from 7 $m^2/g$ to 9 $m^2/g$.

9. The anode active material for a lithium secondary battery of claim 1, wherein SPAN in Equation 2 is in a range from 0.1 to 3.0.

10. The anode active material for a lithium secondary battery of claim 1, further comprising a carbon-based active material.

11. The anode active material for a lithium secondary battery of claim 10, wherein a content of the silicon-based active material is greater than 0 wt %, and less than or equal to 10 wt % based on a total weight of the anode active material for a lithium secondary battery.

12. A lithium secondary battery comprising:
   an anode comprising the anode active material for a lithium secondary battery according to claim 1; and
   a cathode facing the anode.

* * * * *